United States Patent
Fesl et al.

(10) Patent No.: US 12,270,474 B2
(45) Date of Patent: Apr. 8, 2025

(54) MECHANICAL SEAL ARRANGEMENT FOR HIGH TEMPERATURE APPLICATIONS

(71) Applicant: EagleBurgmann Germany Gmbh & Co. KG, Wolfratshausen (DE)

(72) Inventors: Andreas Fesl, Otterfing (DE); Benjamin Hellmig, Munich (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 39 days.

(21) Appl. No.: 17/923,725

(22) PCT Filed: May 11, 2021

(86) PCT No.: PCT/EP2021/062522
§ 371 (c)(1),
(2) Date: Nov. 7, 2022

(87) PCT Pub. No.: WO2021/228884
PCT Pub. Date: Nov. 18, 2021

(65) Prior Publication Data
US 2023/0175590 A1    Jun. 8, 2023

(30) Foreign Application Priority Data
May 14, 2020 (DE) ................. 10 2020 113 068.6

(51) Int. Cl.
*F16J 15/34* (2006.01)
(52) U.S. Cl.
CPC ....... *F16J 15/3452* (2013.01); *F16J 15/3496* (2013.01)
(58) Field of Classification Search
CPC ...... F16J 15/34; F16J 15/3436; F16J 15/3452; F16J 15/3496
See application file for complete search history.

(56) References Cited

U.S. PATENT DOCUMENTS 3,124,502 A * 3/1964 Radke .............. F16J 15/20
  428/378
4,768,790 A * 9/1988 Netzel ............. F16J 15/3464
  277/377

(Continued)

FOREIGN PATENT DOCUMENTS

DE    20217983 U1    2/2003
DE    202005011137 U1    9/2005

(Continued)

OTHER PUBLICATIONS

International Search Report issued in PCT/EP2021/062522, dated Aug. 12, 2021.

(Continued)

*Primary Examiner* — Gilbert Y Lee
(74) *Attorney, Agent, or Firm* — Troutman Pepper Locke LLP; Scott D. Wofsy

(57) ABSTRACT

The invention relates to a mechanical seal arrangement (1) comprising a mechanical seal (2) having a rotating seal ring (3) with a first sealing surface (3a) and a stationary seal ring (4) with a second sealing surface (4a), a pre-tensioning device (6), to pre-tension one of the two sliding rings in the axial direction (X-X), a secondary sealing member (7) disposed on a rear side (40) of the axially pre-tensioned sliding ring, the pre-tensioning device (6) pre-tensioning the axially pre-tensioned sliding ring via the secondary sealing member (7), and a sleeve (8), which is arranged radially inside the secondary sealing member (7), the secondary sealing member (7) being arranged on the rear side (40) of the axially pre-tensioned sliding ring, the secondary sealing member (7) having a sealing edge (70) which is closed in an annular shape in the circumferential direction which projects from the secondary sealing member (7) in the axial direction (X-X) to the axially pre-tensioned sliding ring, wherein the sealing edge (70) seals against the rear side (40) of the (Continued)

Figure 1:
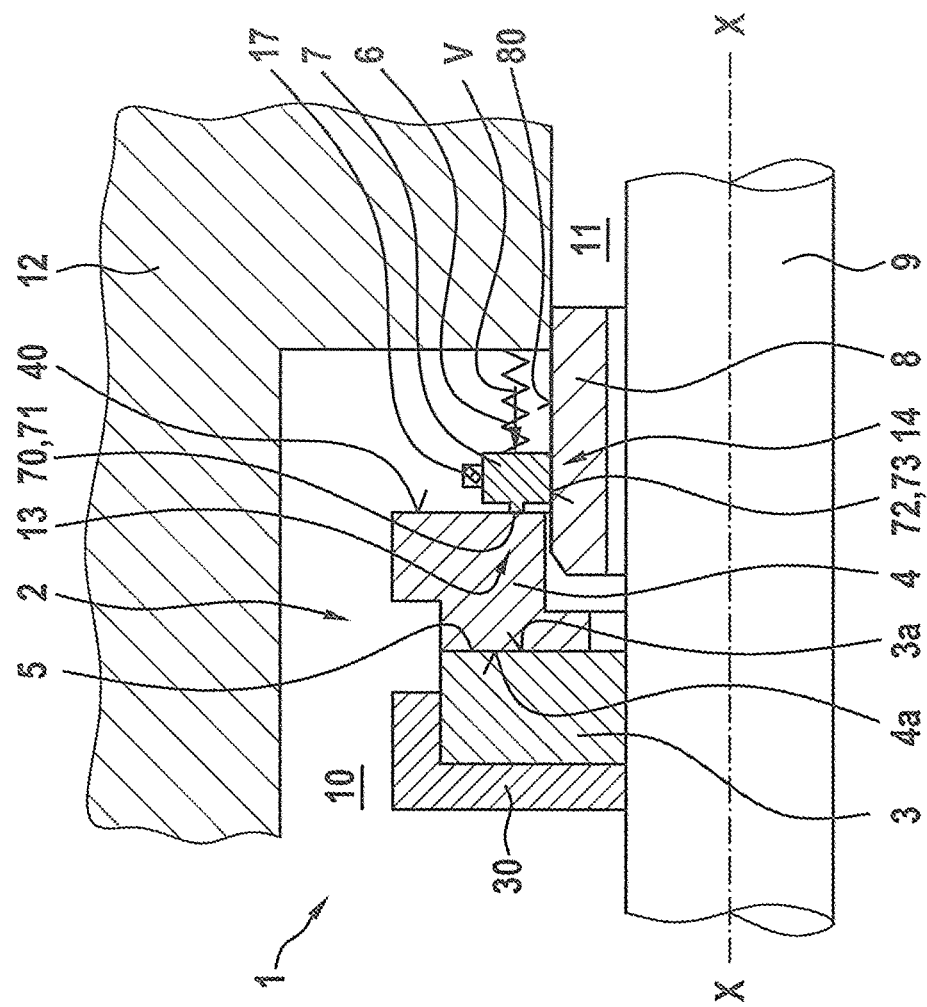

axially pre-tensioned sliding ring, and wherein the secondary sealing member (7) further seals against the outer circumference of the sleeve (8) with an inner circumferential surface (73).

15 Claims, 7 Drawing Sheets

(56) References Cited

U.S. PATENT DOCUMENTS

| | | | | |
|---|---|---|---|---|
| 5,172,918 | A * | 12/1992 | Pecht | F01D 11/003 |
| | | | | 277/400 |
| 5,700,013 | A | 12/1997 | Baty | |
| 6,848,689 | B2 * | 2/2005 | Auber | F16J 15/3464 |
| | | | | 277/377 |
| 7,240,904 | B2 * | 7/2007 | Droscher | F16J 15/3464 |
| | | | | 277/584 |
| 8,523,186 | B2 * | 9/2013 | Schrufer | F16J 15/3472 |
| | | | | 277/377 |
| 9,790,952 | B2 * | 10/2017 | Shamseldin | F16J 15/3492 |
| 2009/0189355 | A1 * | 7/2009 | Ueda | B29B 7/22 |
| | | | | 277/350 |

FOREIGN PATENT DOCUMENTS

| | | |
|---|---|---|
| DE | 1020120022465 | 5/2014 |
| EP | 3293426 A1 | 3/2018 |
| JP | H6101765 A | 4/1994 |
| JP | 2002195420 A | 7/2002 |
| JP | 2006506592 A | 2/2006 |
| JP | 2006275286 A | 10/2006 |
| JP | 2009501302 A | 1/2009 |
| JP | 2016501345 A | 1/2016 |

OTHER PUBLICATIONS

EP Communication under Art 94 (3)EPC dated Jun. 18, 2024, issued during the prosecution of EP 21726611.3.

* cited by examiner

MECHANICAL SEAL ARRANGEMENT FOR HIGH TEMPERATURE APPLICATIONS

CROSS-REFERENCE TO RELATED APPLICATIONS

This application is a U.S. National Phase Application filed under 35 U.S.C. § 371, based on International Patent Application No. PCT/EP2021/062522, filed May 11, 2021, which claims priority to German Patent Application No. 10 2020 113 068.6, filed on May 14, 2020, which are incorporated herein by reference.

The present invention relates to a mechanical seal arrangement for high-temperature applications, in particular for temperatures above 200° C. of gaseous media to be sealed, in particular greater than 800° C.

Mechanical seal arrangements are known from prior art in various embodiments. In high-temperature applications using temperatures above 200° C., in particular above 500° C., the highest requirements are to be put on the components of the mechanical seal arrangement. This is particularly true for secondary seals, which may no longer be made of PTFE or as O-rings of an elastic material for high-temperature applications. Therefore, such high-temperature applications require several mechanical seal arrangements to usually be connected in series, which, in turn, result in significant increase of costs for sealing such machines. Furthermore, for this serial connection of the mechanical seal arrangements large space requirement in axial direction is needed for a rotating component to be sealed, which undesirably lengthens such machines in the axial direction. Therefore, metal bellows which are very expensive and complex to manufacture have been used so far for high-temperature applications. To withstand not only high temperatures but also high pressures, these bellows have to be reinforced, making them even more expensive.

Another problem range in high-temperature applications arises from the usually very high pressures, which may cause additional leakage problems, especially when using secondary seals.

Therefore, it is the object of the present invention to provide a mechanical seal arrangement allowing reliable high-temperature sealing of a gaseous medium to be sealed and having simple and inexpensive design.

This object will be achieved by providing a mechanical seal arrangement having the features of claim 1, the subclaims showing preferred further embodiments of the invention.

In contrast, the mechanical seal arrangement according to the invention having the features of claim 1 has the advantage that even in high-temperature applications involving temperatures>200° C., in particular>500° C., further in particular>800° C., and at high pressures, in particular>than $80 \times 10^5$ Pa, further in particular>than $250 \times 10^5$ Pa, reliable sealing is possible both at sliding surfaces of the seal rings and at existing secondary seals. According to the invention, this will be achieved by using the mechanical seal arrangement comprising a mechanical seal having a rotating seal ring with a first sliding surface and a stationary seal ring with a second sliding surface defining a sealing gap therebetween. Further, a pre-tensioning device is provided for pre-tensioning one of the two seal rings in the axial direction X-X of the mechanical seal arrangement. Furthermore, a secondary sealing member is arranged on a rear side of the axially preloaded seal ring. Preferably, the stationary seal ring is axially pre-tensioned. Furthermore, the mechanical seal arrangement comprises a sleeve which is arranged radially inside the secondary sealing member. According to the invention, a sleeve is understood to be a separate, sleeve-shaped, hollow cylindrical component or a sleeve-shaped extension, for example on a housing component. The secondary sealing member is arranged on a rear side of the axially pre-tensioned sliding ring and has an annularly closed, i.e. circumferentially closed, sealing edge. The sealing edge protrudes in the axial direction X-X on a side of the secondary sealing member facing the axially pre-tensioned sliding ring and seals against the back of the axially pre-tensioned sliding ring. As a result, an annular seal can be achieved between the secondary sealing member and the axially pre-tensioned sliding ring using the sealing edge. Furthermore, the secondary sealing member further seals with an inner circumferential surface on the outer circumference of the sleeve. Thus, the secondary sealing member has two sealing areas, which are, on the one hand, the sealing edge directed toward the rear side of the axially pre-tensioned sliding ring and, on the other hand, the inner circumferential surface of the secondary sealing member. The pre-tensioning device is arranged such that axial pre-tensioning of the axially pre-tensioned sliding ring occurs through the secondary sealing member. This allows secure sealing to be made at the rear side of the axially pre-tensioned sliding ring by the sealing edge of the secondary sealing member. A pre-tensioning force of the pre-tensioning device is thus directed in the axial direction X-X onto the axially pre-tensioned sliding ring through the secondary sealing member.

Preferably, the secondary sealing member is made of a hard material having a Vickers hardness HV of greater than or equal to 2000 HV. This ensures the robustness necessary against high temperatures and/or high pressures of the secondary sealing member. Furthermore, secure pre-tensioning of the axially pre-tensioned sliding ring may be realized through the secondary sealing member. Particularly preferably, the secondary sealing member is made of a ceramic material. Preferably, the secondary sealing member is made of silicon carbide (SiC) or tungsten carbide (WC). Thus, the secondary sealing member is elastomer-free and inelastic, so that during axial pre-tensioning of the sliding ring, reliable force transmission from the pre-tensioning device to the axially pre-tensioned sliding ring through the secondary sealing member is made possible.

Particularly preferably, a hardness of the secondary sealing member is at least equal to a hardness of the axially pre-tensioned sliding ring. Preferably, the hardness of the secondary sealing member is greater than the hardness of the axially pre-tensioned sliding ring. According to an alternative embodiment of the invention, the axially pre-tensioned sliding ring and the secondary sealing member are made of the same material. Further preferably, the axially pre-tensioned sliding ring, the secondary sealing member and the sleeve are made of the same material, in particular silicon carbide.

Further preferably, the surfaces where the axially pre-tensioned sliding ring and the secondary sealing member as well as the secondary sealing member and the sleeve are in contact with each other are machined using a fine machining process, in particular grinding and/or polishing or the like, to achieve the lowest possible roughness at the contact surfaces between the components.

Particularly preferably, the secondary sealing member has a first coating on one end face of the sealing edge. In this case, the coating is preferably designed such that a roughness of the coating which is in contact with the rear side of the axially pre-tensioned sliding ring is as low as possible.

Preferably, the coating is made of diamond or tungsten disulfide. Further preferably, the secondary sealing member comprises a second coating on the inner peripheral surface which is in contact with the sleeve. Preferably, the second coating is formed of the same material as the first coating and further preferably has the same coating thickness.

According to another preferred embodiment of the invention, the sleeve has a third coating on its outer periphery. Still further preferably, the rear side of the axially pre-tensioned sliding ring also has a fourth coating. Preferably, the third and fourth coatings are provided of the same material as the first and/or second coating, particularly preferably of diamond or tungsten disulfide. All coatings are preferably made of the same material and having same thickness.

In order to make it as easy as possible to assemble the secondary sealing member, on the one hand and, to provide particularly good sealing of the secondary sealing member at the inner circumferential surface on the other hand, the secondary sealing member is subdivided into a plurality of segments. The subdivision is preferably implemented as three individual segments. The segments arranged adjacent to each other have corresponding overlap regions where the segments overlap in the axial direction and/or radial direction.

With the segmented design of the secondary sealing member, a device for radial pre-tensioning of the segments is further preferred. This device is, for example, an annular spring or a plurality of individual springs which pre-tension the segments in the radially inwards direction. As a result, the segments are located very close to the outer circumference of the sleeve, which further increases sealing of the secondary sealing member at the inner circumferential surface.

To provide maximum ease of manufacture of the sealing edge and, in particular, also sufficient contact area between the sealing edge and the rear side of the axially pre-tensioned sliding ring, the sealing edge preferably has a square cross-section, in particular a rectangular cross-section. Preferably, a radial height H is greater than or equal to an axial length L of the sealing edge.

Preferably, the sealing edge is arranged on a radially inwardly directed corner region of the secondary sealing member on the side facing the rear side of the axially pre-tensioned sliding ring. This allows a highly relieved mechanical seal to be provided.

Still further preferably, the secondary sealing member further has an additional sealing edge which is arranged on an inner circumferential surface of the secondary sealing member. The geometric shape of the sealing edge projecting towards the rear of the axially pre-tensioned mechanical seal ring and the further sealing edge projecting radially inwards is preferably such that both sealing edges have the same cross-section.

The mechanical seal arrangement is designed to seal gaseous media. The design according to the invention means that even in high-temperature applications and at very high pressures, it is not necessary to connect several mechanical seals in series.

Figure 2:
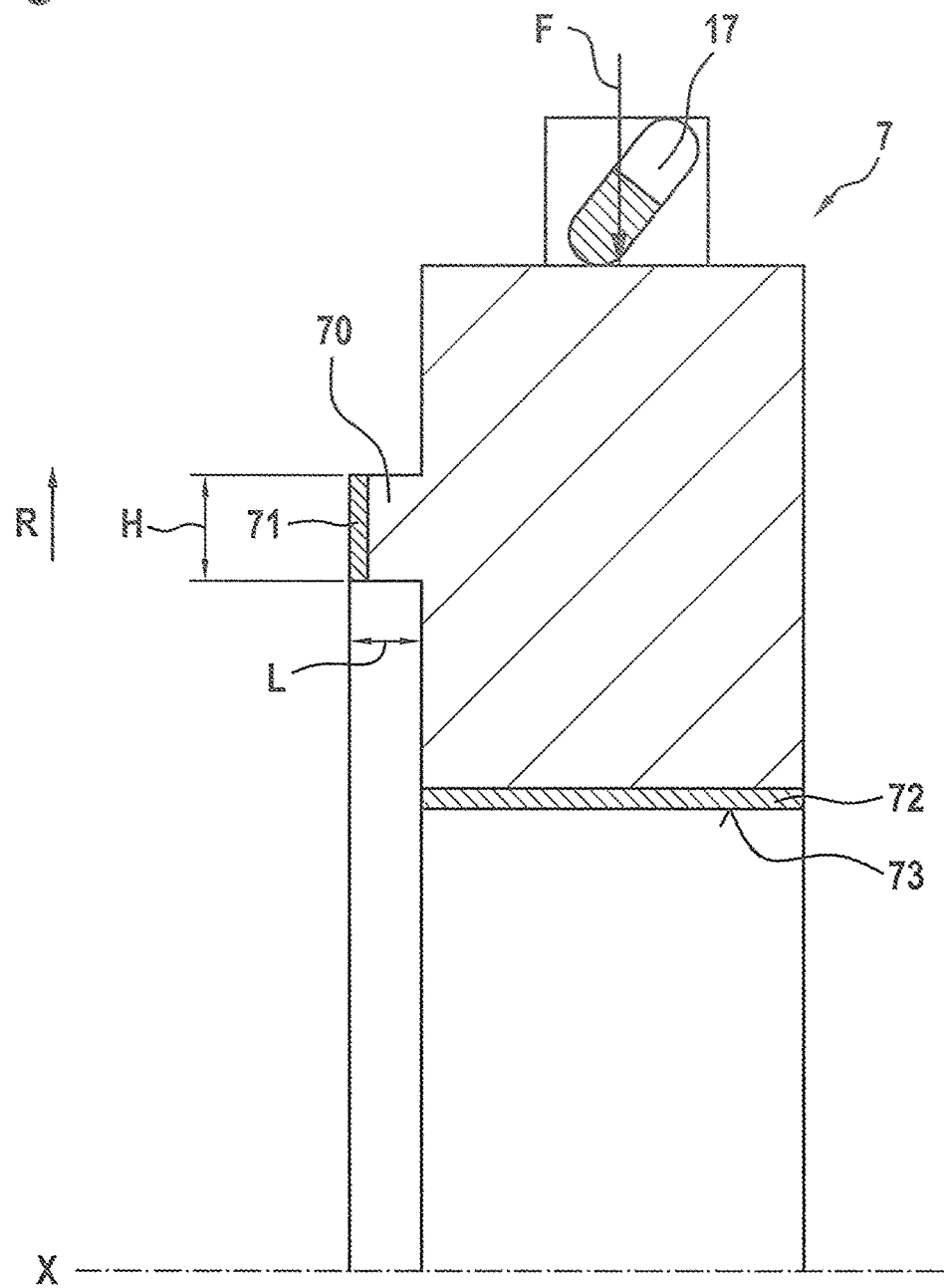
Figure 3:
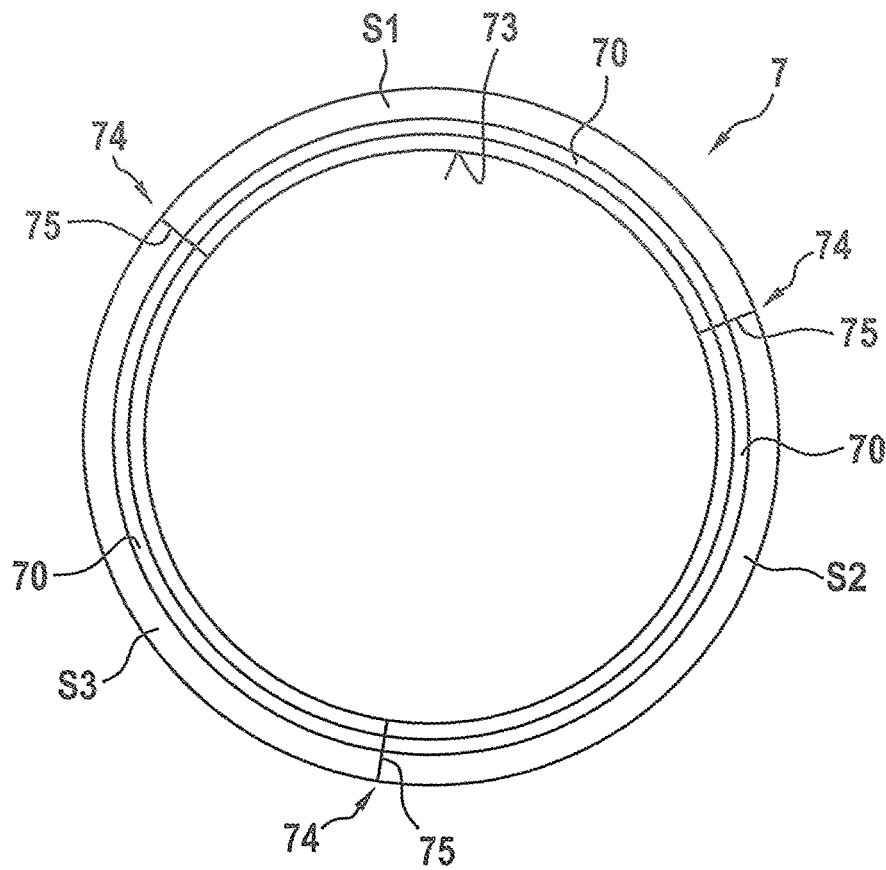
Figure 4:
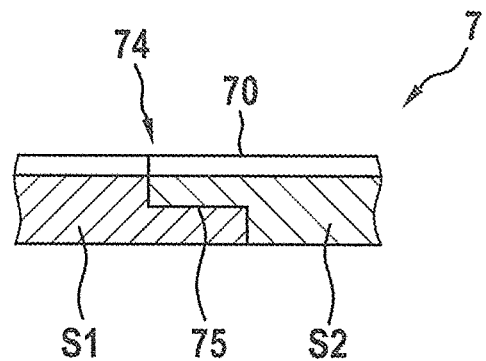
Figure 5:
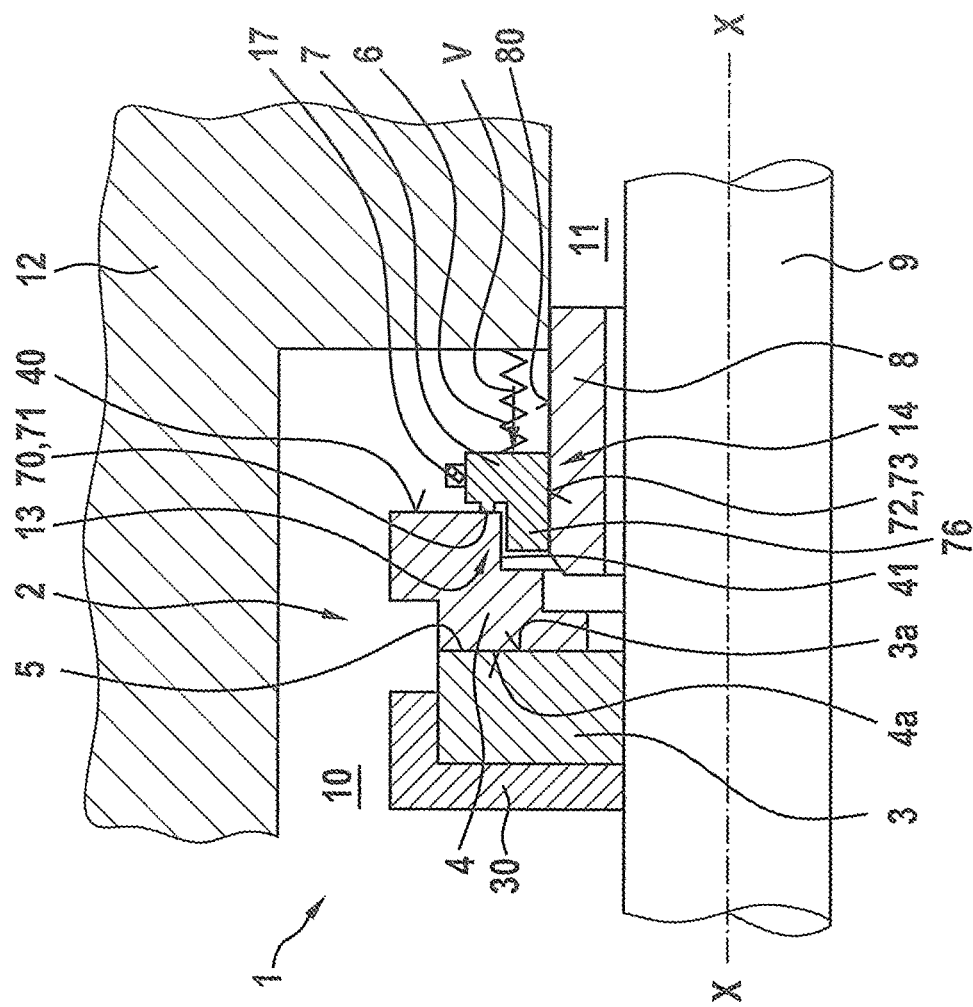
Figure 6:
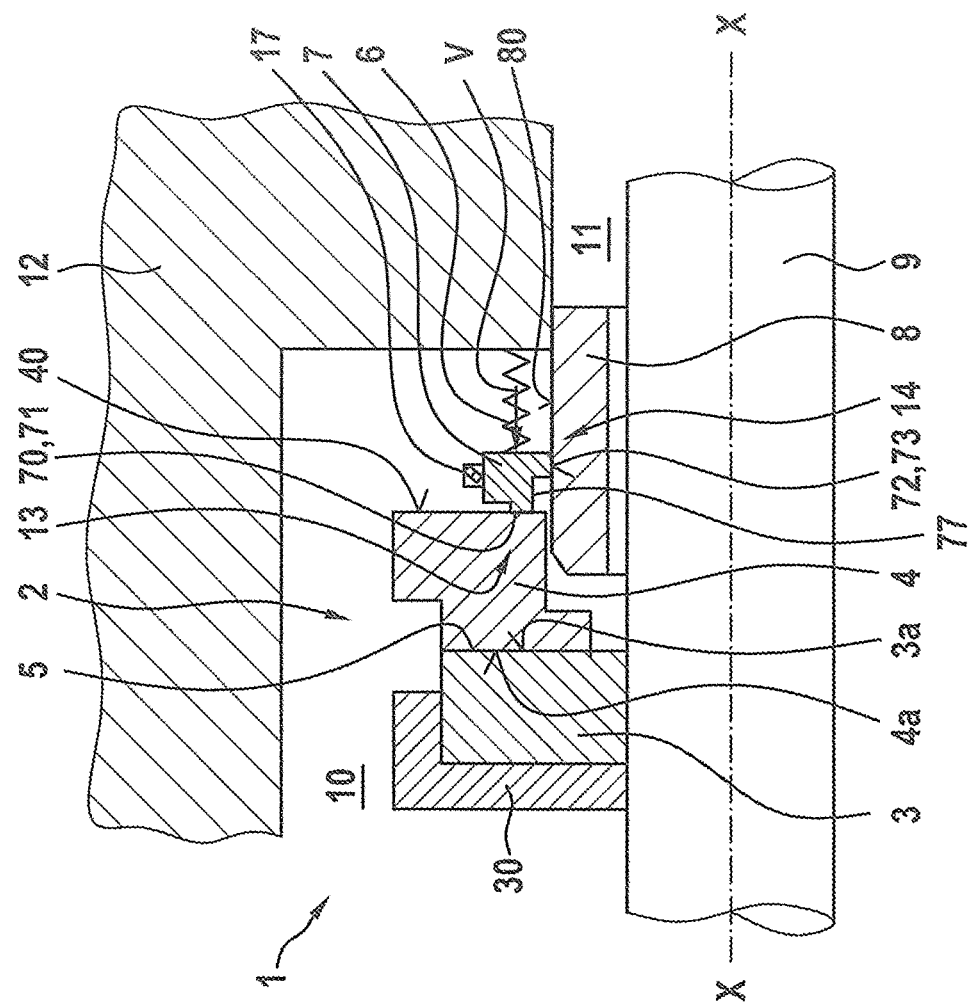
Figure 7:
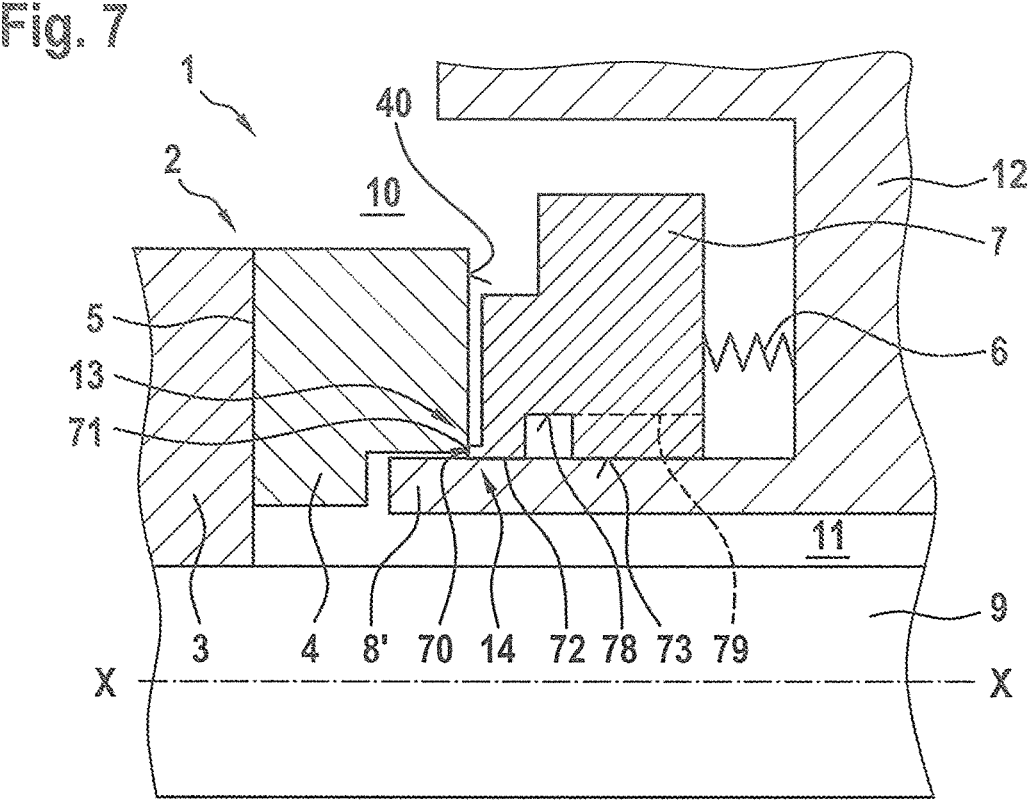
Figure 8:
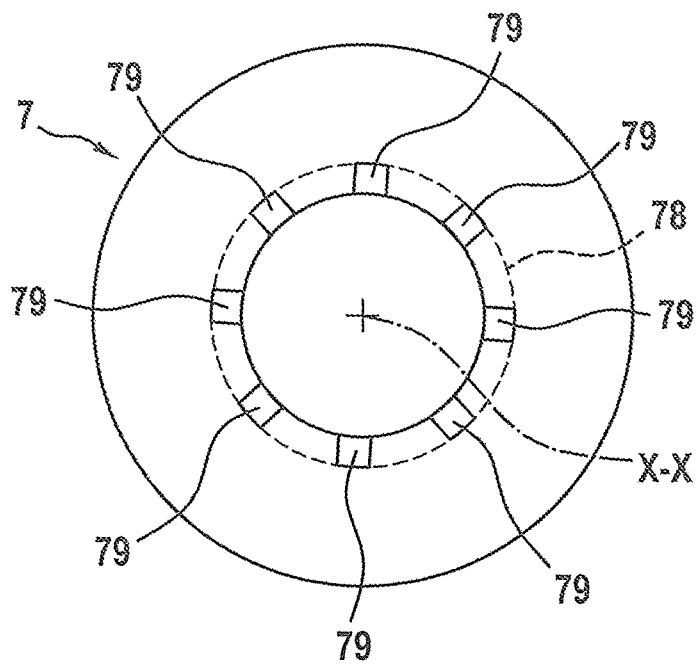
Figure 9:
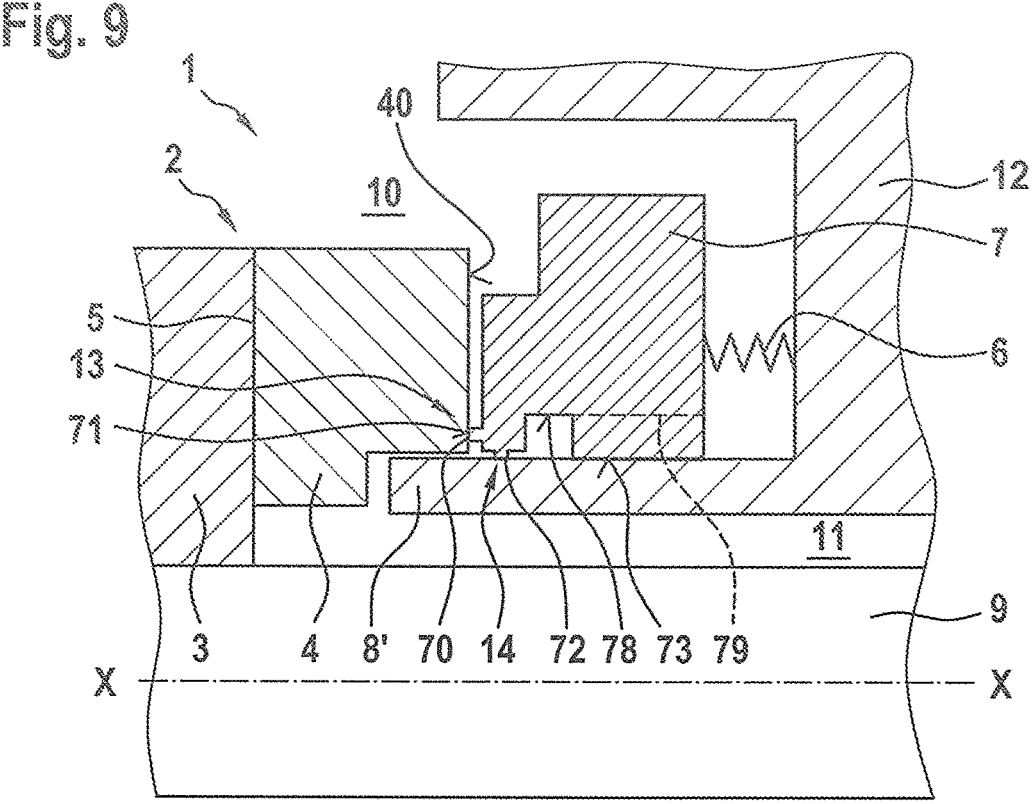

In the following, several embodiments of the invention are described in detail while making reference to the accompanying drawing, wherein:

FIG. 1 is a schematic sectional view of a mechanical seal arrangement according to a first embodiment of the invention, FIG. 2 is a schematic partial sectional view of a secondary sealing member of the mechanical seal arrangement of FIG. 1, FIG. 3 is a schematic top view of the secondary sealing member of FIG. 2, FIG. 4 is a schematic partial sectional view of the secondary sealing member of FIG. 3, FIG. 5 is a schematic sectional view of a mechanical seal arrangement according to a second embodiment of the invention, FIG. 6 is a schematic sectional view of a mechanical seal arrangement according to a third embodiment of the invention, FIG. 7 is a schematic sectional view of a mechanical seal arrangement according to a fourth embodiment of the invention, FIG. 8 is a schematic representation of the secondary sealing member of FIG. 7 in the axial direction, and FIG. 9 is a schematic sectional view of a mechanical seal arrangement according to a fifth embodiment of the invention.

While making reference to FIGS. 1 to 4, in the following a mechanical seal arrangement 1 according to a first preferred embodiment of the invention is described in detail.

As may be seen from FIG. 1, the mechanical seal arrangement 1 comprises a mechanical seal 2 having a rotating sliding ring 3 with a first sliding surface 3a and a stationary sliding ring 4 with a second sliding surface 4a. A sealing gap 5 is defined between the sliding surfaces of the seal rings 3, 4.

The mechanical seal 2 seals a product area 10 from an atmosphere region 11.

Furthermore, the mechanical seal arrangement 1 comprises a pre-tensioning device 6 which, as may be seen from FIG. 1, comprises a plurality of helical springs (only one helical spring is shown in FIG. 1) which are arranged along the circumference and pre-tension the mechanical seal 2 in the axial direction X-X.

Furthermore, the mechanical seal arrangement 1 comprises a secondary sealing member 7, which is arranged on the axially pre-tensioned seal ring, which, in this example embodiment, is the stationary seal ring 4, at the rear side 40 thereof.

The pre-tensioning device 6 is arranged between the secondary sealing member 7 and a housing 12. Thus, the stationary seal ring 4 is pre-tensioned in the axial direction X-X using the pre-tensioning device 6 via the secondary sealing member 7. The pre-tensioning force is indicated by the arrow V in FIG. 1.

Furthermore, the mechanical seal arrangement 1 comprises a hollow cylindrical sleeve 8, which is arranged in a stationary manner. The sleeve 8 is connected to the housing 12, for example. The sleeve 8 is arranged radially inside the secondary sealing member 7.

The rotating seal ring 3 is connected to a rotating shaft 9 using a seal ring carrier 30.

The secondary sealing member 7 may be seen in detail from FIGS. 2 to 4. In particular, as shown in FIG. 3, the secondary sealing member 7 comprises a first sealing edge 70 which is annularly closed in the circumferential direction. In this case, the sealing edge 70 protrudes from the secondary sealing member 7 in the axial direction X-X in the direction of the axially pre-tensioned sliding ring. As may be seen from FIG. 1, the sealing edge 70 abuts against the rear side 40 of the stationary sliding ring 4, thus sealing against a first sealing area 13.

As may be seen from FIG. 1, the secondary sealing member 7 thus has a first sealing area 13 at the sealing edge 70, where sealing against the stationary sliding ring 4 is performed, and a second sealing area 14 at an inner circumferential surface 73, where sealing between the secondary sealing member 7 and an outer circumference of the sleeve 8 is performed. Herein, the contact area at the first sealing area of the sealing edge 70 is much smaller than at the second sealing area between the inner circumferential surface 73 and the sleeve 8.

As may be seen further from FIG. 2, the sealing edge 70 is formed such that a height H in the radial direction R is greater than a length L of the sealing edge in the axial direction X-X.

As may further be seen from FIGS. 3 and 4, the secondary sealing member 7 is made of a plurality of segments S1, S2, S3 in the circumferential direction, each of which has a pitch circle shape. In this example embodiment, three segments S1, S2 and S3 are provided. Three overlap areas 74 are thus formed at the respective transitions between the segments S1, S2, S3, which may be seen in detail in FIG. 4. A segment gap 75 is provided at each of the overlap areas 74, at which the respective segments S1, S2, S3 partially overlap.

The secondary sealing member 7 is made of a hard material, for example a ceramic material, in particular SiC. Thus, the mechanical seal arrangement 1 is elastomer-free and moreover does not have a component made of another elastic material, in particular PTFE, which is commonly used for secondary sealing members. Thus, the mechanical seal arrangement 1 is designed for high temperature applications with temperatures greater than 200° C. and high pressure applications with pressures greater than $80 \times 10^5$ Pa.

Furthermore, the secondary sealing member 7 has a first coating 71 on an end face of the sealing edge 70, and a second coating 72 on the inner peripheral surface 73.

Furthermore, the sleeve 8 has a third coating 80 on its outer periphery. The coatings are preferably provided of diamond or tungsten disulfide.

In this application, the coatings in particular allow to achieve the smoothest possible contact surface at the sealing areas 13, 14 between the components secondary sealing member 7 and stationary sliding ring 4 and secondary sealing member 7 and sleeve 8. In particular, the coatings is to omit post-processing steps of the surfaces in contact with each other at the two sealing areas 13, 14 at the sealing edge 70 and the inner circumferential surface 73 of the secondary sealing member 7.

The first and second coatings 71, 72 shown in FIG. 2 are actually much smaller, in particular a few tenths of a mm, and are drawn broader in FIG. 2 only for clarification.

Furthermore, the mechanical seal arrangement 1 comprises an annular spring 17, which inwardly pre-tensions the segmented secondary sealing member 7 in the radial direction with a spring force F. On the one hand, this keeps the secondary sealing member 7 together, which consists of the three segments S1, S2, S3, and on the other hand, a minimal gap is realized between the inner circumferential surface 73 of the secondary sealing member 7 and the sleeve 8. As a result, improved sealing will be achieved at the second sealing area 14 between the secondary sealing member 7 and the sleeve 8.

Thus, dynamic sealing may be realized at the rear side 40 of the axially movable stationary sliding ring 4, i.e. the non-rotating sliding ring 4. In this context, dynamic sealing is particularly preferably feasible at temperatures up to 800° C. and at very high pressures up to $250 \times 10^5$ Pa. In particular, the use of bellows elements for sealing may also be omitted.

FIG. 5 shows a mechanical seal arrangement 1 according to a second embodiment of the invention. Identical or functionally identical parts are designated with the same reference numbers as in the first example embodiment.

As may be seen from FIG. 5, in contrast to the first example embodiment, the stationary sliding ring 4 in the second example embodiment has a recess 41 at the rear side 40. Furthermore, the secondary sealing member 7 has an axial annular flange 76 projecting in the axial direction X-X.

As may be seen from FIG. 5, the axial annular flange 76 is arranged radially inside the recess 41. Compared with the first example embodiment, this embodiment achieves a reduced load due to the medium to be sealed, which is located in the product area 10 and is under high pressure. Thus, a relieved mechanical seal can be provided, which in particular is for reducing the pre-tensioning forces V of the pre-tensioning device 6 necessary for pre-tensioning. Otherwise, this example embodiment corresponds to the previous example embodiment, so that reference may be made to the description given therein.

FIG. 6 shows a mechanical seal arrangement 1 according to a third embodiment of the invention, with identical or functionally identical parts designated by the same reference numbers as in the preceding example embodiments.

As may be seen from FIG. 6, in the third example embodiment, a recess 77 is provided on the inner peripheral surface 73 of the secondary sealing member 7. The recess 77 reduces the sealing area between the secondary sealing member 7 and the sleeve 8 at the second sealing area 14 of the secondary sealing member 7.

Furthermore, in the third example embodiment, the sealing edge 70 is arranged radially further inwardly offset in the direction of the inner circumferential surface 73. This provides a significantly more loaded mechanical seal 2 compared to the second example embodiment, since a load factor of the mechanical seal, which is defined as the ratio of a hydraulically loaded surface to the sliding surface between the sliding rings 3, 4, is significantly larger than in the second example embodiment, since positioning of the sealing edge 70 significantly reduces the hydraulically loaded surface. Otherwise, this example embodiment corresponds to the previous example embodiment, so that reference may be made to the description given therein.

FIGS. 7 and 8 show a mechanical seal arrangement 1 according to a fourth example embodiment of the invention. Identical or functionally identical parts are designated using the same reference numbers as in the preceding examples embodiment.

As can be seen from FIG. 7, the secondary sealing member 7 has a different design. Here, the secondary sealing member 7 has the sealing edge 70 at the innermost radius of the inner circumferential surface of the secondary sealing member 7. Thereby, the sealing edge 70 also has a first coating 71. Furthermore, a second sealing area 14 is provided between the secondary sealing member 7 and a sleeve-shaped extension 8' connected to the housing 12 on the secondary sealing member 7 only at the region directed towards the stationary sliding ring 4. Here, the second coating 72 is formed on this second sealing area 14. Thus, instead of a separate sleeve being formed in the fourth example embodiment as in the preceding examples, the sleeve-shaped extension 8' is formed.

As can be further seen from FIGS. 7 and 8, the secondary seal 7 further includes an annular groove 78 on the inner circumferential surface 73 which defines the second sealing area 14. Furthermore, a plurality of axial channels 79 are provided at the inner circumferential area, as can be seen in particular from FIG. 8. The axial channels 79 thereby connect the product area 10 with the annular groove 78. The intermediate areas between the axial channels 79 of the secondary sealing member 7 are to support the secondary sealing member 7 on the sleeve-shaped extension 8.

Since the sealing edge 70 is now arranged at the radially innermost region of the secondary sealing member 7, a mechanical seal can be provided which is largely load-relieved. In the fourth example embodiment, axial and radial sealing on the secondary sealing member 7 is focused on the corner region facing the stationary sliding ring 4. It should be noted that a third coating may of course also be provided on the sleeve-shaped extension 8' as in the previous example embodiments. Otherwise, this example embodiment corresponds to the preceding examples embodiment, so that reference may be made to the description given therein.

FIG. 9 shows a mechanical seal arrangement 1 according to a fifth example embodiment of the invention, wherein identical or functionally identical parts are designated by the same reference numbers.

The fifth example embodiment essentially corresponds to the fourth example embodiment, also comprising an annular groove 78 and a plurality of axial channels 79 on the secondary seal 7 as in the fourth example embodiment. Contrary to the fourth example embodiment, in the fifth example embodiment a second sealing edge 70' is formed next to the first sealing edge 70, which is directed radially inwards, as shown in FIG. 9. The second sealing edge 70' seals against the sleeve-shaped extension 8', which is integrally formed with the housing 12. The first sealing edge 70, which is directed towards the rear side 40 of the stationary sliding ring 4, seals against the rear side 40. Also, in this example embodiment, particularly relieved sealing can be provided. Preferably, coatings as previously described are provided on both sealing surfaces of the sealing edges 70, 70', respectively. It should be noted that the first sealing edge 70, which seals on the rear side 40 of the stationary sliding ring 4, is arranged on the secondary seal 7 radially inwards as far as possible. In this case, the sealing edge 70 is arranged radially further inwards than a bottom of the annular groove 78, as may clearly be seen from FIG. 9.

Otherwise, this example embodiment corresponds to the previous examples embodiment, so that reference can be made to the description given therein.

LIST OF REFERENCE NUMBERS

1 Mechanical seal arrangement
2 Mechanical seal
3 Rotating seal ring
3a First sliding surface on rotating seal ring
4 Stationary seal ring (axially pre-tensioned seal ring)
4a Second sliding surface on stationary seal ring
5 Sealing gap
6 Pre-tensioning device
7 Secondary sealing member
8 Sleeve
8' Sleeve-shaped extension
9 Shaft
10 Product area
11 Atmosphere region
12 Housing
13 First sealing area
14 Second sealing area
17 Annular spring
30 Rotating seal ring carrier
40 Back of stationary seal ring
41 Rear side 40 recess
70 First sealing edge
70' Second sealing edge
71 First coating
72 Second coating
73 Inner circumferential surface
74 Overlap area
76 Axial ring flange
77 Recess on secondary sealing member
78 Annular groove
79 Axial channels
80 Third coating on outer circumference of sleeve 8
F Spring force of the annular spring
H Height in radial direction
L Length in axial direction
R Radial direction
S1 First segment
S2 Second segment
S3 Third segment
V Pre-tensioning force of pre-tensioning device
X-X Axial direction

The invention claimed is:

1. A mechanical seal arrangement, comprising:
a mechanical seal including a rotating sliding ring having a first sliding surface and a stationary sliding ring having a second sliding surface, defining a sealing gap therebetween;
a pre-tensioning device for pre-tensioning one of the two sliding rings in the axial direction;
a secondary sealing member arranged on a rear side of the axially pre-tensioned seal ring, the pre-tensioning device pre-tensioning the axially pre-tensioned seal ring via the secondary sealing member; and
a sleeve which is arranged radially inside the secondary sealing member, wherein the secondary sealing member has a circumferentially annularly closed sealing edge which projects from the secondary sealing member towards the axially pre-tensioned sliding ring in the axial direction, wherein the sealing edge is of the same material as the secondary sealing member, wherein the sealing edge seals against the rear side of the axially pre-tensioned sliding ring, and wherein the secondary sealing member is in direct contact on the outer circumference of the sleeve with an inner circumferential surface,
wherein the sealing edge has a quadrangular cross-section.

2. The mechanical seal arrangement according to claim 1, wherein the secondary sealing member is made of a hard material having a hardness≥2000 HV.

3. The mechanical seal arrangement according to claim 2, wherein the secondary sealing member is made of a ceramic material, in particular silicon carbide or tungsten carbide.

4. The mechanical seal arrangement according to claim 1, wherein a hardness of the secondary sealing member is at least equal to a hardness of the axially pre-tensioned seal ring.

5. The mechanical seal arrangement according to claim 1, wherein the axially pre-tensioned seal ring and the secondary sealing member are made of the same material or wherein the axially pre-tensioned mechanical seal ring and the secondary sealing member and the sleeve are made of the same material.

6. The mechanical seal arrangement according to claim 1, wherein the secondary sealing member has a first coating on an end face of the sealing edge and/or wherein the secondary sealing member has a second coating on the inner circumferential surface.

7. The mechanical seal arrangement according to claim 6, wherein the sleeve has a third coating on its outer circumference.

8. The mechanical seal arrangement according to claim 7, wherein the first coating and/or the second coating and/or the third coating are made of the same material and the coatings are all made of the same thickness.

9. The mechanical seal arrangement according to claim 1, wherein the secondary sealing member is pre-tensioned radially inwards using a pre-tensioning element.

10. The mechanical seal arrangement according to claim 1, wherein a height of the sealing edge in radial direction is greater than a length of the sealing edge in axial direction.

11. The mechanical seal arrangement according to claim 1, wherein the sealing edge is arranged at a radially inner corner region of the secondary sealing member.

12. The mechanical seal arrangement according to claim 1, further comprising another sealing portion arranged at the inner circumferential surface of the secondary sealing member.

13. The mechanical seal arrangement according to claim 1, wherein the sealing edge is the only secondary sealing element contacting the rear side of the stationary seal ring.

14. A mechanical seal arrangement, comprising:
a mechanical seal including a rotating sliding ring having a first sliding surface and a stationary sliding ring having a second sliding surface, defining a sealing gap therebetween;
a pre-tensioning device for pre-tensioning one of the two sliding rings in the axial direction;
a secondary sealing member arranged on a rear side of the axially pre-tensioned seal ring, the pre-tensioning device pre-tensioning the axially pre-tensioned seal ring via the secondary sealing member; and
a sleeve which is arranged radially inside the secondary sealing member, wherein the secondary sealing member has a circumferentially annularly closed sealing edge which projects from the secondary sealing member towards the axially pre-tensioned sliding ring in the axial direction, wherein the sealing edge is of the same material as the secondary sealing member, wherein the sealing edge seals against the rear side of the axially pre-tensioned sliding ring, and wherein the secondary sealing member is in direct contact on the outer circumference of the sleeve with an inner circumferential surface, wherein the secondary sealing member is divided into a plurality of segments in the circumferential direction, wherein the sealing edge has a quadrangular cross-section.

15. The mechanical seal arrangement according to claim 14, wherein the sealing edge is the only secondary sealing element contacting the rear side of the stationary seal ring.

* * * * *